US010001082B2

(12) United States Patent
Conet et al.

(10) Patent No.: US 10,001,082 B2
(45) Date of Patent: Jun. 19, 2018

(54) LOCKING/UNLOCKING DEVICE FOR A ONE-PIECE COWL OF A THRUST REVERSER OF A TURBOJET ENGINE NACELLE

(71) Applicant: AIRCELLE, Gonfreville L'Orcher (FR)

(72) Inventors: Olivier Conet, Gruchet le Valane (FR); Rémi Pujol, Feytiat (FR); Michel Jean, Montivilliers (FR); Jean-Francois Thouement, Toutainville (FR)

(73) Assignee: AIRCELLE, Gonfreville L'orcher (FR)

( * ) Notice: Subject to any disclaimer, the term of this patent is extended or adjusted under 35 U.S.C. 154(b) by 594 days.

(21) Appl. No.: 14/560,218

(22) Filed: Dec. 4, 2014

(65) Prior Publication Data
US 2015/0292436 A1    Oct. 15, 2015

Related U.S. Application Data

(63) Continuation of application No. PCT/FR2013/051300, filed on Jun. 6, 2013.

(51) Int. Cl.
*F02K 1/76* (2006.01)
*B64D 29/06* (2006.01)

(52) U.S. Cl.
CPC .............. *F02K 1/766* (2013.01); *B64D 29/06* (2013.01)

(58) Field of Classification Search
CPC ........ F05D 2260/30; F02K 1/625; F02K 1/72; F02K 1/763; F02K 1/766; B64D 29/06
See application file for complete search history.

(56) References Cited

U.S. PATENT DOCUMENTS

| 4,174,609 | A | * | 11/1979 | Legrand | B64D 29/06 60/290 |
| 5,620,212 | A | * | 4/1997 | Bourne | B64D 29/06 292/113 |
| 7,484,356 | B1 | * | 2/2009 | Lair | F02K 1/72 60/226.2 |

FOREIGN PATENT DOCUMENTS

| EP | 1 298 309 A1 | 4/2003 |
| FR | 2 860 554 A1 | 4/2005 |
| FR | 2 952 908 A1 | 5/2011 |

OTHER PUBLICATIONS

International Search Report dated Sep. 12, 2013 in International Application No. PCT/FR2013/051300.

* cited by examiner

*Primary Examiner* — William H Rodriguez
*Assistant Examiner* — William Breazeal
(74) *Attorney, Agent, or Firm* — Burris Law, PLLC

(57) ABSTRACT

An assembly for a turbojet engine includes a pylon, a nacelle supported by the pylon, and a locking device interposed between the pylon and a cowl of the nacelle. The cowl slides between operating and maintenance positions. The locking device is movable between active and inhibited positions, and the device allows an operation mode in the active position and a maintenance mode in the inhibited position. In particular, the locking device comprises a rocker to maintain the cowl to the pylon, and the rocker includes an inhibiting lever and an activation lever. The inhibiting and activation levers are mounted on a switching shaft of the locking device. The inhibiting lever is set in rotation through an actuator, providing direct access from a bypass flow duct in the active position while the activation lever is set in rotation from the bypass duct in the inhibited position.

12 Claims, 3 Drawing Sheets

Figure 1:
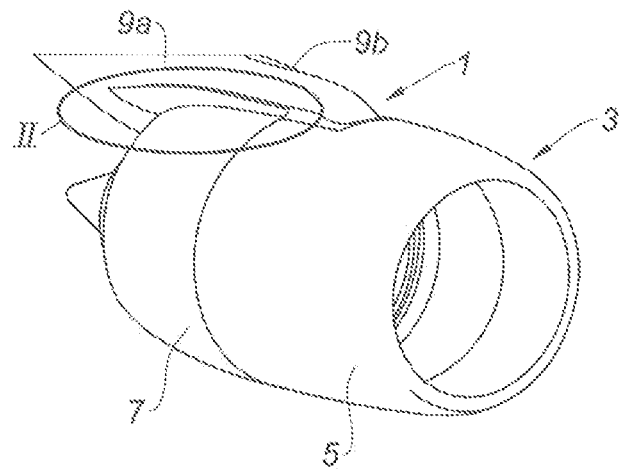

LOCKING/UNLOCKING DEVICE FOR A ONE-PIECE COWL OF A THRUST REVERSER OF A TURBOJET ENGINE NACELLE

CROSS-REFERENCE TO RELATED APPLICATIONS

This application is a continuation of International Application No. PCT/FR2013/051300, filed on Jun. 6, 2013, which claims the benefit of FR 12/55365, filed on Jun. 8, 2012. The disclosures of the above applications are incorporated herein by reference.

FIELD

The present disclosure relates to an assembly for a turbojet engine of an aircraft.

BACKGROUND

The statements in this section merely provide background information related to the present disclosure and may not constitute prior art.

An aircraft is driven by several turbojet engines each housed in a nacelle. The nacelle has generally a tubular structure comprising an air inlet upstream of the turbojet engine, a middle section intended to surround a fan of the turbojet engine, a downstream section accommodating the thrust reverser means and intended to surround the combustion chamber of the turbojet engine and, usually ended by an ejection nozzle situated downstream of the turbojet engine.

This nacelle is intended to accommodate a double flow turbojet engine capable of generating through the blades of the rotating fan a hot air flow, coming from the combustion chamber of the turbojet engine, and a cold air flow which circulates outside the turbojet engine through an annular channel which is called bypass flow duct.

The thrust reverser device is, during the landing of the aircraft, intended to improve the braking ability thereof by redirecting forward at least a part of the thrust generated by the turbojet engine.

The structure of a thrust reverser comprises a reverser cowl displaceable between, on the one hand, a deployed position in which it opens a passage within the nacelle intended for the diverted air flow, and on the other hand, a retracted position in which it closes this passage.

At least two types of reverser cowl are known from the prior art.

The one-piece cowl, of an almost annular shape, is known, extending from one side to another of the pylon without interruption, and often referred to as "O-duct", in allusion to the shell shape of such a cowl, as opposed to the "D-duct", which in fact comprises two half-cowls each extending over half the circumference of the nacelle.

In a case like the other, it is the decline of the cowl by sliding along the rails integral with the pylon which allows to release the thrust reverser cascades, and thus to implement the thrust reverser function.

It is of course crucial that such sliding movement cannot occur in an unexpected manner: such opening would indeed be fatal in flight phase.

For these reasons, safety locks are provided at different locations of the thrust reverser to block the unwanted opening of the cowl.

In a "D-duct" thrust reverser, three safety locks for each half cowl are conventionally provided: two locks called primary directly acting on the two actuating cylinders of each half cowl, and a third lock called tertiary interposed between the beam said "6 hours" (that is to say disposed in the lower portion of the nacelle and on which the two half cowls are slidably mounted) and the half cowl concerned.

Independent power sources are provided for these locks so as to increase the reliability of the safety device.

The remote location of the third lock with respect to the two others also offers a gain of safety vis-à-vis a "duct burst" (explosion of a duct) or of a vane loss: in such a case, only one or two lock(s) could possibly be destroyed, but not all of them.

In an "O-duct" thrust reverser, there is by definition no 6 hours beam: So the implementation of a third lock as in a "D-duct" thrust reverser is not possible.

From the prior art, the French patent delivered and published under the number FR 2 952 908 is known, owned by the applicant, in which the protected present disclosure relates to means for locking the sliding of the thrust reverser "O-duct" cowl interposed between the pylon and said cowl.

Figure 2:
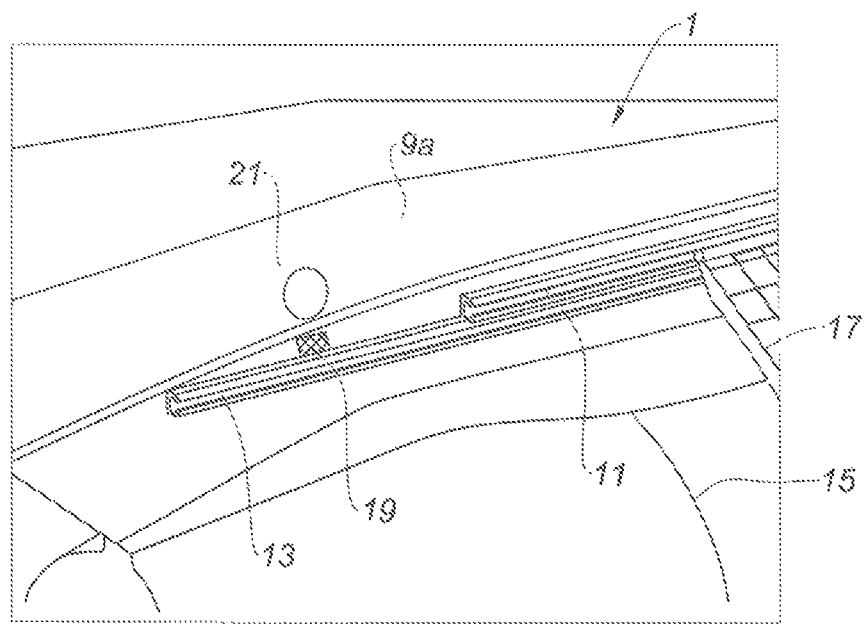

FIGS. 1 and 2 illustrate such locking means according to the prior art.

An aircraft turbojet engine assembly comprises a pylon 1 to which a nacelle 3 is suspended, typically comprising an upstream fixed cowl 5 and a downstream movable cowl 7, the upstream and the downstream being understood with respect to the air flow flowing through the nacelle.

In the operating position of the nacelle, that is to say out of the maintenance operations on the turbojet engine, the downstream cowl 7 is slidably mounted between the position shown in FIG. 1, called "direct jet" position, and a position (not shown) slid towards the downstream of the nacelle, allowing to perform a thrust reverser function by rejection of a portion of the air passing through the nacelle upstream thereof.

The thrust reverser shown in FIG. 1 is of the "O-duct" type, that is to say the sliding cowl 7 forms a substantially annular one-piece part extending without discontinuity from a side 9a of the pylon 1 to the opposite side 9b of this pylon.

FIG. 2 relates to the area II of FIG. 1, the sliding cowl 7 having been removed for a better visibility.

The pylon 1 and, on the side 9a of this pylon, a short rail 11 and a long rail 13 can be seen.

The inner structure 15 surrounding the turbojet engine, defining bypass flow duct can also be seen.

The short rail 11 allows the sliding of the cascade vanes 17 of the air flow between a service position shown in FIG. 2, and a maintenance position wherein these cascades are slid to the rear end of the short rail 11, so as to allow the access to the turbojet engine.

The long rail 13 and its counterpart disposed in the other side of the pylon 1 allow the sliding of the cowl 7 between an operating position, comprising a direct jet position and a thrust reverser position in which it releases the cascade vanes 17, allowing the orientation of a portion of the air flow circulating in the bypass flow duct to the front of the nacelle, and a maintenance position (not shown).

A locking device 19 is mounted inside the pylon 1. This device allows providing the maintaining of the cowl in a closed position, that is to say corresponding to an operation of the nacelle in direct jet mode. A hatch 21 formed on the side 9a of the pylon 1 allows to have access to the locking device.

The locking device is, according to the state of the art, and as illustrated in FIGS. 1 and 2, enclosed inside a hatch made in the wall of the pylon to which the nacelle and turbojet engine are fastened.

Such an arrangement has several drawbacks.

First of all, the form of a hatch in the pylon requires to locally cut a portion of the flank of the pylon, which affects the structural strength of said pylon.

Then, during maintenance operations on the turbojet engine, the locking device must be inhibited in order to be able to have access to the turbojet engine. It is therefore obligatory to dismount this hatch for each maintenance operation, which greatly increases the time of access to the engine.

Thus, there is a need for disposing a tertiary lock for a one-piece cowl of thrust reverser, the inhibition of which can be manually accomplished by an operator from the outside the cowl, on the one hand without having to dismount any hatch, and on the other hand without affecting the structural strength of the pylon.

SUMMARY

The present disclosure provides an assembly for a turbojet engine, comprising a pylon and a nacelle supported by said pylon and surrounding the turbojet engine so as to define a bypass flow duct into which a secondary air flow flows, said nacelle comprising least one thrust reverser device comprising a one-piece cowl slidably mounted alternately between an operating position and a maintenance position of the nacelle, said assembly comprising at least one locking/unlocking device of the sliding of said cowl, interposed between said pylon and said cowl, said device comprising retention means of said cowl, said device being alternately movable between an active position allowing an operation mode of the nacelle and an inhibited position allowing a maintenance mode of said nacelle, said assembly being remarkable in that the locking/unlocking device comprises a switching rocker of retention means, said rocker comprising at least one inhibiting lever of retention means and at least one activation lever of said retention means, said levers being mounted on a switching shaft of said device, said inhibiting lever being capable of being set in rotation by the intermediary of actuating means directly accessible from the bypass flow duct when the locking/unlocking device is in active position, and said activation lever being capable of being set in rotation from said duct when said device is in inhibited position.

Thus, the presence of a switching rocker with at least two levers, whose activation of either one of the levers is directly performed from the bypass flow duct, allows a rapid passage from one to the other of the operation modes of the locking/unlocking device without having to dismount the hatch, which allows reducing the time of access to the engine of the aircraft and improving the structural strength of the pylon.

According to a feature of the present disclosure, the actuating means comprise at least one push button/pusher assembly comprising at least one push button capable of being directly actuated from the bypass flow duct when the locking/unlocking device is in active position so as to interact with at least one pusher integral with the inhibiting lever.

The activation of the push button/pusher assembly constitutes a means allowing to simply carry out the passage from the active position to the inhibited position of the locking/unlocking device. The operator manually exerts a pressure on the push button accessible from the bypass flow duct.

According to another feature of the present disclosure, the push button/pusher assembly is enclosed at least partially in a guide body, and in that said assembly is movable in translation along a substantially longitudinal axis of said body.

Advantageously, the push button/pusher assembly comprises position maintaining means comprising at least one spring-loaded ball alternately housed in a retention groove of said guide body for an active position of the locking/unlocking device, and in an inhibition groove of said guide body for an inhibited position of said device.

The spring-loaded balls allow providing to maintain in position the push button/pusher assembly, in active position and in inhibited position of locking/unlocking device.

In another form, the maintaining in position means may comprise at least one safety ball housed in a safety groove of said guide body for an active position of the locking/unlocking device.

The safety balls installed in the push button, allow providing that the push button/pusher assembly is not unexpectedly moved in the flight phase of the aircraft.

In still another form, the position maintaining means also comprise elastic means positioned between the push button and the pusher.

The retention means comprise at least one movable striker capable of cooperating with at least one bolt integral with the one-piece cowl for an active position of said device, and of liberating said bolt for an inhibition position of said device.

According to other feature of the present disclosure, the switching rocker comprises visual control means representative of the inhibited and active positions of said device, said visual control means being enclosed inside the pylon for an active position of the locking/unlocking device, and at least partially uncovered and accessible from the bypass flow duct for an inhibited position of said device.

Thus, by equipping the locking/unlocking device of such visual control means, shaped to be partially uncovered only after manual activation of the actuating means, the operator is provided that the reverser cowl is detached from the pylon as long as the visual control means are in an uncovered position.

The visual control means comprise a reference end integral with the activation lever.

The actuating means are integral with a supporting plate integral with the pylon and having at least one aerodynamic surface.

The supporting plate comprises at least one slot shaped to be traversed at least partially by the activation lever for an inhibited position of the locking/unlocking device.

Further areas of applicability will become apparent from the description provided herein. It should be understood that the description and specific examples are intended for purposes of illustration only and are not intended to limit the scope of the present disclosure.

DRAWINGS

Figure 3:
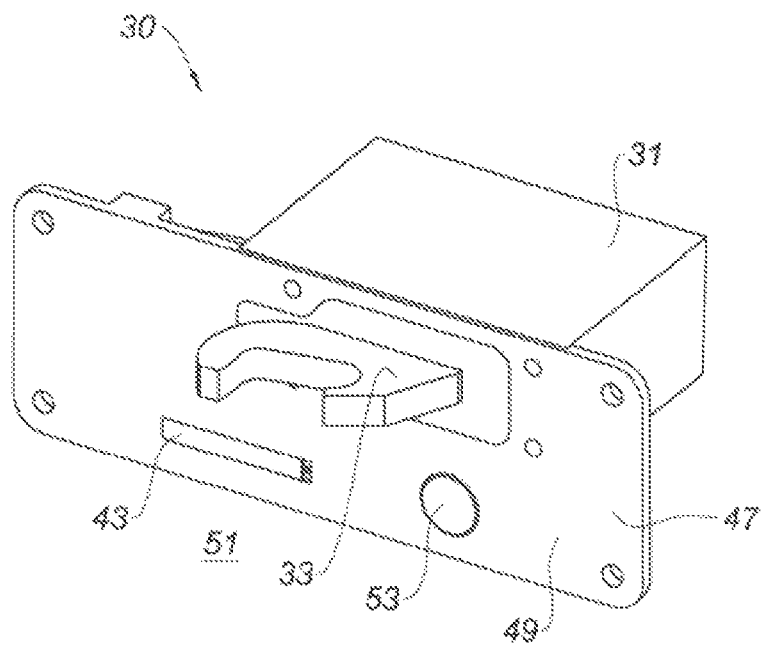
Figure 4:
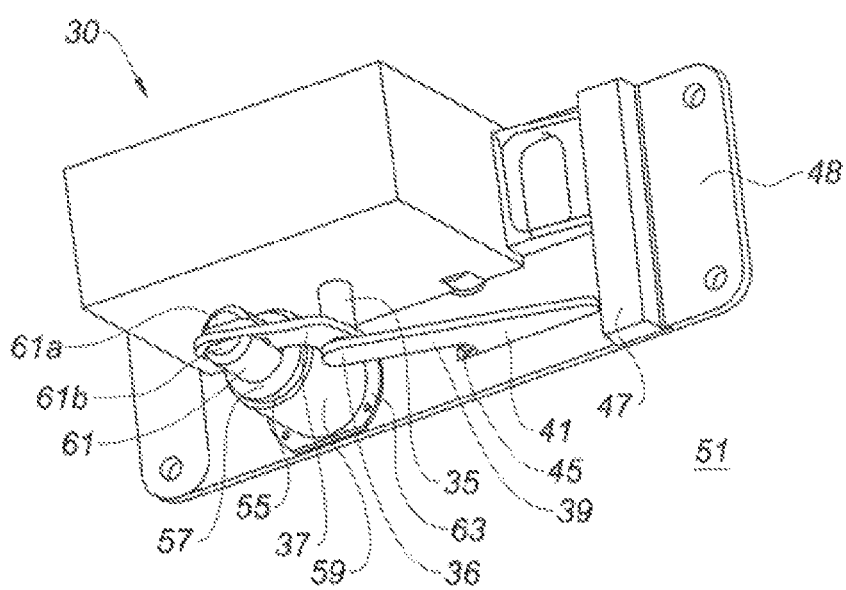
Figures 5A, 5B, 5C:
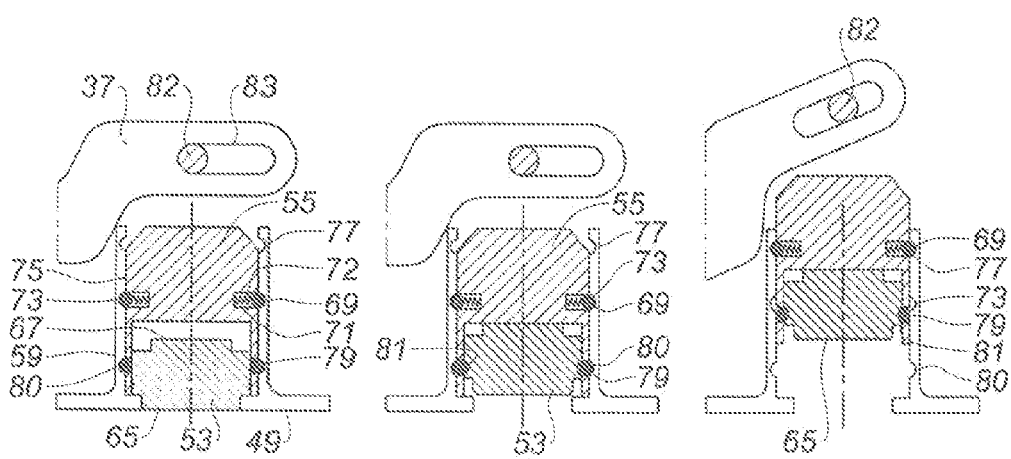
Figure 6:
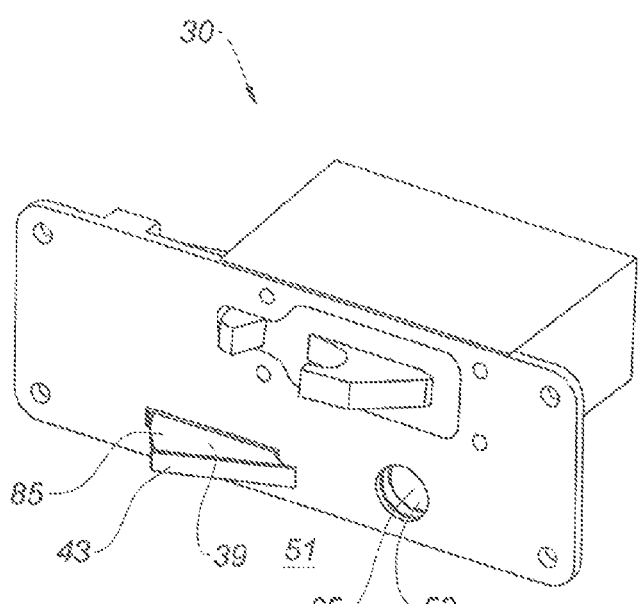

In order that the disclosure may be well understood, there will now be described various forms thereof, given by way of example, reference being made to the accompanying drawings, in which:

FIGS. 1 and 2 illustrate an assembly for turbojet engine according to the prior art;

FIG. 3 schematically shows the locking/unlocking device according to the present disclosure in an active position, observed from the bypass flow duct into which the air flow flows;

FIG. 4 shows the locking/unlocking device observed from inside the pylon;

FIGS. 5*a* to 5*c* illustrate the locking/unlocking device seen in section along the longitudinal axis of the push button/pusher assembly; and FIG. 6 is a view similar to that of FIG. 3, the locking/unlocking device being in an inhibited position.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Referring to FIG. 3 illustrating the locking/unlocking device 30 according to the present disclosure, shown here in a position called active position, corresponding to a mode according to which the nacelle is in operation, either in direct jet, or in reverse jet.

In direct jet operation, the locking/unlocking device is engaged, that is to say the downstream cowl is stationary relative to the upstream fixed cowl.

In reverse jet operation, the locking/unlocking device is retracted, that is to say the downstream cowl is movable in translation, then allowing the deployment of the thrust reverser. The downstream cowl is then capable of being immobilized by the passage of said device to its engaged position when the operation phase in reverse jet is completed.

Also, the locking/unlocking device is capable of being switched between the active position and an inhibited position allowing a maintenance mode of the nacelle, in order to allow an operator to perform maintenance works on the ground. The inhibited position of the locking/unlocking device allows the compete opening of the downstream cowl, facilitating the access to the turbojet engine.

The locking/unlocking device 30 is installed in the pylon (not shown) to which the turbojet engine and the nacelle are suspended.

The device 30 comprises retention means allowing the downstream cowl to be maintained to the pylon in order that the downstream cowl does not open in the flight phase.

The retention means comprise a lock comprising a body 31 within which a striker 33 is mounted capable of cooperating with a bolt (not shown) supported by the downstream cowl. The striker is movable in rotation about a switching shaft 35 (visible in FIG. 4) of the locking/unlocking device.

More specifically, the striker 33 is integral with an axis (not shown) driven in rotation through the switching shaft 35 of the locking/unlocking device. A device for reversing the direction of rotation known to the skilled in the art may be provided between the switching shaft 35 and the axis to which the striker is connected.

Referring to FIG. 4, on the switching shaft 35 a switching rocker 36 of the locking/unlocking device is mounted, alternately allowing a passage of said device between an active position and an inhibited position.

The switching rocker comprises an inhibiting lever 37 and an activation lever 39, each integral with the switching shaft 35.

The activation lever comprises a body 41 and a handling end 43 (visible in FIG. 3) of the activation lever 39, and capable of temporarily passing through a slot 45 carried out on a supporting plate 47.

The supporting plate has an inner wall 48 substantially planar, and adopts, for example, a rectangular shape. This form may have to be changed at will.

The supporting plate 47 is intended to be fixed to the pylon; the inner wall 48 being positioned inside the pylon. The maintaining of the plate 47 to the pylon is carried out for example by screwing.

By briefly referring to FIG. 3, the plate 47 also has an outer wall 49 intended to be in contact with a bypass flow duct 51 into which a secondary air flow flows. Thus, the outer wall 49 has an aerodynamic surface.

Referring to FIG. 4, when the locking/unlocking device is in active position, the body 41 of the activation lever 39 is fully enclosed inside the pylon, and the handling end of said lever is in the alignment of the aerodynamic surface carried out by the supporting plate 47. In such a position, the body 41 is hidden by the supporting plate 47, and thus not visible by the operator from the bypass flow duct.

The switching shaft 35 receives a torsion spring (not shown) in order to maintain the activation lever 39 by default in a position representative of the active position of the locking/unlocking device, and thus to maintain the handling end of the activation lever 39 in the alignment of the supporting plate 47.

In addition, the activation lever 39 is advantageously made of aluminum in order to minimize the mass of the locking/unlocking device. Of course, the use of any other material likely to minimize the mass of the device can be considered.

The locking/unlocking device also comprises actuating means, whose activation allows a detachment of the striker 33 and of the bolt.

The actuating means comprise an assembly composed of a push button 53 (visible in FIG. 3) accessible for an operator from the bypass flow duct, and of a pusher 55.

The pusher 55 has a first body 57 of a substantially cylindrical shape, which is enclosed, at least partially when the device 30 is in an active position, in guide body 59 of a substantially cylindrical shape and which is substantially concentric to the first body 57 of the pusher 55.

The pusher 55 has moreover a second cylindrical body 61, also substantially concentric with said first body and positioned in its extension. The second body 61 has two hemispheres 61*a* and 61*b* allowing the passage of the inhibiting lever 37.

The guide body 59 is brought on the supporting plate 47 thanks to a flange 63 carried out at the base of the guide body.

The flange 63 is for example screwed to the supporting plate 47. The fact that the guide body is brought to the plate facilitates the manufacture of said plate and said guide body. However, it is of course possible to perform the assembly comprising the supporting plate and the guide body in a single-piece if the skilled in the art finds a particular interest in that.

Moreover, the guide body 59 also comprises grooves intended to receive the rows of balls, as described in more detail in the following description, with reference to FIGS. 5*a* to 5*c*.

The push button 53/pusher 55 assembly, the guide body 59 and the inhibiting lever 37 are advantageously made of titanium, in order to get good contacts between the parts. Of course, it is possible to make these parts in any other material if necessary.

Referring now to FIGS. 5*a* to 5*c*, which illustrate the locking/unlocking device seen in section along the longitudinal axis of the push button/pusher assembly.

The push button 53 comprises a handling wall 65 entering in the alignment of the aerodynamic surface of the outer wall 49 of the supporting plate when the locking device is in active position.

The push button 53 comprises a bearing wall 67 intended to come into contact with the pusher 55 when an operator exerts a pressure on the handling wall 65 in order to carry out the switching operation of the locking/unlocking device from an active position to an inhibited position, as explained in more detail below.

In order to stabilize the push button 53/pusher 55 assembly in one of the two extreme positions of the locking/unlocking device, the latter comprises position maintaining means.

Said position maintaining means comprise a plurality of balls 69 called "spring" balls mounted in a housing 71 entering at the side wall of the pusher 55.

These balls are maintained in part outside their housing 71 thanks to elastic means carried out for example by compression springs 72 bearing against the bottom of said housing.

In order to allow the stabilization of the pusher 55 in a position corresponding to the active position of the locking/unlocking device shown in FIG. 5a, the balls 69 are contained in a retention groove 73 carried out at the inner wall 75 of guide body 59.

The guide body also comprises an inhibiting groove 77 which allows the blocking of the push button/pusher assembly during its translational displacement.

When the device is in an inhibited position, position shown in FIG. 5c, the balls 69 are contained in the inhibiting groove 77, which allows the stabilization of the pusher 55 in this inhibiting position.

The position maintaining means provide the stability of the push button in the two aforesaid extreme positions.

In order to increase the safety and to prevent an inadvertent displacement of the push button, the maintaining means advantageously comprise safety balls 79 positioned, in active position of the locking/unlocking device, in a safety groove 80 of the guide body 59.

To this end, the push button 53 comprises a safety groove 81 shaped to receive said safety balls for all displacement of the push button 53 inside the guide body 59, alternately between an active position and an inhibited position.

In addition, elastic means, constituted for example by a compression spring (not shown), may also be positioned between the bearing wall 67 of the push button 53 and the pusher 55 in order to prevent an unwanted displacement of the push button due to the vibrations undergone by the nacelle. These elastic means also constitute a safety means preventing any unwanted displacement of the push button 53. Such a compression spring can be used alone or in conjunction with the safety balls.

In addition, any other means to avoid an unexpected contact between the push button and the pusher may be considered. Additionally, the push button/pusher assembly can also be made in a single-piece if necessary.

In one form, the position maintaining means may comprise only the spring ball 69. The position maintaining of the assembly is thus provided only by said balls 69, and by said compression spring.

As shown in FIGS. 5a to 5c, the pusher 55 also comprises a rod 82 of a cylindrical shape, intended to penetrate into an opening 83 of the inhibiting lever 37.

The longitudinal axis of the rod 82 is substantially parallel to the switching shaft of the locking/unlocking device.

The opening 83 adopts the shape of an oblong hole in order to allow setting in rotation the inhibiting lever 37 during the translational displacement of the rod 82.

The rod 82 is translated either following the activation of the actuating means by the operator, that is to say by exerting a pressure on the handling wall 65 of the push button 53, or following the exerting of a pressure on the activation lever 39 in order to switch the locking/unlocking device from an inhibited position to an active position.

The operation of the locking/unlocking device according to the present disclosure is described with reference to all FIGS. 3 to 6.

When the locking/unlocking device is in active position, the push button/pusher assembly is in the position shown in FIG. 5a.

In this position, the push button 53 and the handling end 43 of the activation lever 39 are in the alignment of the outer wall 49 of the supporting plate 47. The inhibiting lever 37 and the body 41 of the activation lever 39 are in turn fully enclosed within the pylon.

When an operator wishes to switch the locking/unlocking device between the active position and the inhibited position, he manually exerts a pressure on the handling wall 65 of the push button 53, directly accessible from the bypass flow duct 51.

The activation of the push button 53 causes an axial displacement of the latter until coming into contact with the pusher 55, as shown in FIG. 5b.

The safety balls 79 are thus freed from their safety groove 80 and are engaged in the safety groove 81 of the push button 53.

The spring balls 69 then come out of their retention groove 73 and the translation of the push button 53/pusher 55 assembly may continue until the spring balls 69 penetrate into the inhibiting groove 77, as shown in FIG. 5c.

The assembly cannot further translate because of the stops directly installed on the switching shaft of the locking/unlocking device.

The action exerted by the push button 53 on the pusher 55, the rod 82 of which is in contact with the opening 83 carried out in the inhibiting lever 37, then drives in rotation said lever.

The inhibiting lever 37, integral with the switching shaft 35 of the locking/unlocking device, drives in rotation said shaft, allowing thus the liberation of the striker 33 of the cowl bolt.

Together, the activation lever 39, itself also integral with the switching shaft 35, pivots in its turn, resulting in the passage of a portion of the body 41 of said lever through the slot 45, and the uncovering of a reference end 85 of the activation lever, as shown in FIG. 6, showing the locking/unlocking device in inhibited position.

The reference end 85 of the activation lever 39 constitutes visual control means representative of the inhibited position of the locking/unlocking device.

To this end, the reference end 85 and the handling end 43 of the activation lever 39 advantageously have a bright color, for example red, so as to visually and quickly inform the operator of the inhibited position of the locking/unlocking device when the reference end 85 is visible from the duct 51.

In such position, the handling wall 65 of the push button 53 is pressed in the guide body 59 due to the position maintaining means.

The downstream cowl can thus be handled, after the sole manual activation from the bypass flow duct of the push button.

When the operator wishes to switch from the inhibited position to an active position, he carries out the reverse operation consisting of exerting a pressure on the handling end 43 of the activation lever 39, which results in the pivoting of the switching rocker 36, and therefore the setting in rotation of the switching shaft 35, and thus the translational displacement of the rod 82 of the pusher 55, resulting thus in the translational displacement of the pusher 55/pusher button 53 assembly, until the spring balls 69 penetrate in the retention groove 73 of the guide body 59, the safety balls 79 penetrate in the safety groove 80 of said guide body, and the handling wall 65 is in the alignment with the outer wall 49 of the supporting plate 47. Simultaneously, the striker 33 becomes integral with the bolt of the cowl reverser, providing thus the maintenance of said cowl to the pylon, and the reference end 85 is enclosed inside the pylon.

Thanks to the present disclosure, it is possible to easily free the reverser cowl in order to carry out maintenance operations. Indeed, the sole exerting of a pressure on the push button directly accessible from the bypass flow duct allows instantly switching the locking/unlocking device of the reverser cowl between an active position and an inhibited position.

Reciprocally, the locking device is switched between the inhibited position and the active position thanks to the sole exerting of a pressure on an activation lever also directly accessible from the bypass flow duct.

Thus, such a device very substantially improves those known from the prior art in that it is no longer necessary to open a hatch made in the pylon. The time of access to the engine is then greatly reduced and the structural strength of the pylon is improved.

Moreover, thanks to visual control means, we make sure that the locking/unlocking device provides the active position and that therefore the reverser cowl is not likely to open in flight.

Finally, as it goes without saying, the present disclosure is not limited only to the forms of this locking/unlocking device, described above as examples, but it contrarily encompasses all the alternatives.

What is claimed is:

1. An assembly for a turbojet engine, comprising:
   a pylon;
   a nacelle supported by said pylon and surrounding the turbojet engine so as to define a bypass flow duct into which a secondary air flow flows, said nacelle comprising at least one thrust reverser device comprising a one-piece cowl slidably mounted alternately between an operating position and a maintenance position of the nacelle; and
   at least one locking/unlocking device of said one-piece cowl being interposed between said pylon and said one-piece cowl, and being alternately movable between an active position and an inhibited position, wherein the active position allows an operation mode of the nacelle and the inhibited position allows a maintenance mode of said nacelle,
   wherein said at least one locking/unlocking device comprises retention element of said one-piece cowl, and a switching rocker of the retention element comprises at least one inhibiting lever of the retention element and at least one activation lever of the retention element, said at least one inhibiting lever and said at least one activation lever being mounted on a switching shaft of said locking/unlocking device, and
   wherein said at least one inhibiting lever is configured to set in rotation through at least one push button/pusher assembly directly accessible from the bypass flow duct when said at least one locking/unlocking device is in the active position, and said at least one activation lever is configured to set in rotation from the bypass flow duct when said at least one locking/unlocking device is in the inhibited position, and wherein the switching rocker comprises a reference end representative of the inhibited position and the active position of said at least one locking/unlocking device,
   said reference end being enclosed inside the pylon for the active position, and at least partially uncovered and accessible from the bypass flow duct for the inhibited position of said at least one locking/unlocking device.

2. The assembly according to claim 1, wherein the at least one push button/pusher assembly comprises at least one push button directly actuated from the bypass flow duct when said at least one locking/unlocking device is in the active position so as to interact with at least one pusher integral with said at least one inhibiting lever.

3. The assembly according to claim 2, wherein the at least one pusher comprises a rod configured to penetrate into an opening of said at least one inhibiting lever, the opening allowing setting in rotation said at least one inhibiting lever during a displacement of the rod.

4. The assembly according to claim 2, wherein the pusher comprises a first cylindrical body and a second cylindrical body, the second cylindrical body formed in an extension of the first cylindrical body, and wherein the second cylindrical body comprises at least two hemispheres allowing a passage of the at least one inhibiting lever therebetween.

5. The assembly according to claim 2, wherein the at least one push button/pusher assembly is at least partially enclosed in a guide body, and the assembly is movable in translation along a longitudinal axis of said guide body.

6. The assembly according to claim 5, wherein the at least one push button/pusher assembly comprises position maintaining means comprising at least one spring ball alternately housed in a retention groove of said guide body for the active position of said at least one locking/unlocking device, and in an inhibiting groove of said guide body for the inhibited position of said at least one locking/unlocking device.

7. The assembly according to claim 6, wherein the position maintaining means comprises at least one safety ball housed in a safety groove of said guide body for the active position of said at least one locking/unlocking device.

8. The assembly according to claim 6, wherein the position maintaining means comprise elastic element positioned between the at least one push button and the at least one pusher.

9. The assembly according to claim 1, wherein the retention element comprise at least one movable striker adapted to cooperate with at least one bolt integral with said one-piece cowl for the active position of said at least one locking/unlocking device, and to free said at least one bolt for the inhibiting position of said at least one locking/ unlocking device.

10. The assembly according to claim 1, wherein the reference end is integral with the at least one activation lever.

11. The assembly according to claim 1, wherein the retention element and the at least one push button/pusher assembly are integral with a supporting plate integral with the pylon and having at least one aerodynamic surface.

12. The assembly according to claim 11, wherein the supporting plate comprises at least one slot shaped to be at least partially traversed by the at least one activation lever for the inhibited position of said at least one locking/unlocking device.

\* \* \* \* \*